United States Patent [19]
von Gutfeld et al.

[11] Patent Number: 6,055,035
[45] Date of Patent: Apr. 25, 2000

[54] METHOD AND APPARATUS FOR FILLING LIQUID CRYSTAL DISPLAY (LCD) PANELS

[75] Inventors: Robert Jacob von Gutfeld, New York; Shui-Chih Alan Lien, Briarcliff Manor, both of N.Y.

[73] Assignee: International Business Machines Corporation, Armonk, N.Y.

[21] Appl. No.: 09/076,147

[22] Filed: May 11, 1998

[51] Int. Cl.[7] ............ G02F 1/13; G02F 1/1341; H01J 9/00; H01J 9/06
[52] U.S. Cl. ............ 349/187; 349/189; 445/24; 445/60
[58] Field of Search .................. 349/187, 189; 445/24, 60

[56] References Cited

U.S. PATENT DOCUMENTS

| | | | |
|---|---|---|---|
| 5,106,441 | 4/1992 | Brosig et al. | 349/187 |
| 5,407,519 | 4/1995 | Joffe et al. | 349/187 |
| 5,625,475 | 4/1997 | Tanioka et al. | 349/123 |
| 5,742,372 | 4/1998 | Furukawa | 349/187 |
| 5,909,266 | 6/1999 | Matsuo et al. | 349/187 |

*Primary Examiner*—William L. Sikes
*Assistant Examiner*—Walter Malinowski
*Attorney, Agent, or Firm*—McGinn & Gibb, P.C.; Louis J. Percello, Esq.

[57] ABSTRACT

A system, apparatus, and method for filling a display panel having first and second plates, with liquid crystal material, includes a nozzle for depositing a layer of liquid crystal material over a surface of a first plate of the panel, a scanning arm, coupled to the nozzle, for uniformly forming the layer of liquid crystal material over the surface of the first plate of the panel, and an attachment mechanism for placing the second plate over the first plate having the liquid crystal material thereover, thereby to form the display panel.

24 Claims, 4 Drawing Sheets

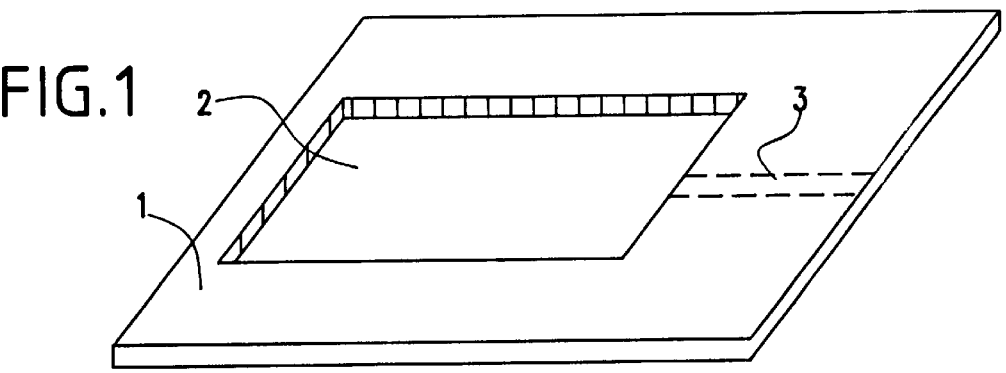
FIG. 1
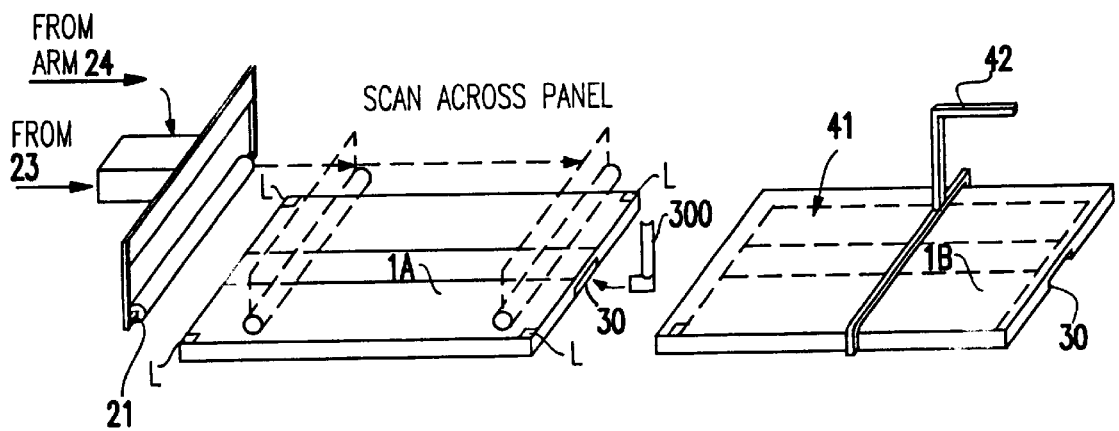
FIG. 3
FIG. 4
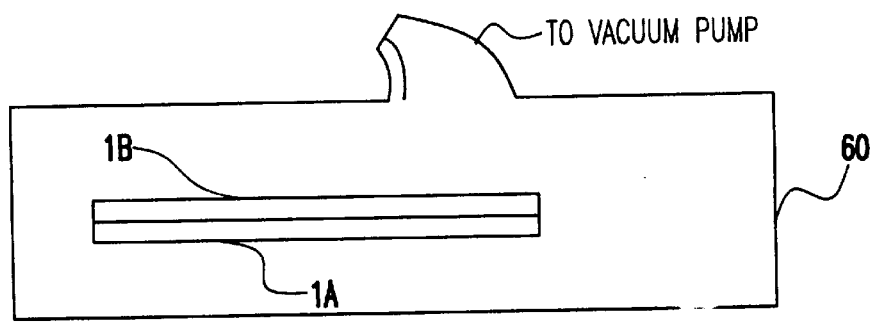
FIG. 6

METHOD AND APPARATUS FOR FILLING LIQUID CRYSTAL DISPLAY (LCD) PANELS

CROSS-REFERENCE TO RELATED APPLICATION

The present application is related to U.S. patent application Ser. No. 09/062,275, filed on Apr. 15, 1998, to Robert von Gutfeld et al., having IBM Docket No. YO998-057, assigned to the present assignee, and incorporated herein by reference.

BACKGROUND OF THE INVENTION

1. Field of the Invention

The present invention generally relates to a method and apparatus for filling a display panel, and more particularly to a method and apparatus for filling a liquid crystal display (LCD) panel with liquid crystal material.

2. Description of the Related Art

Currently, many methods exist for filling liquid crystal display panels. However, such methods are extremely time-consuming, and thus the throughput is low for displays incorporating such liquid crystal panels.

Several attempts have been made to improve the speed, while maintaining cleanliness, with which the liquid crystal (LC) material filling process occurs. Recent improvements have been disclosed in the above-mentioned U.S. patent application Ser. No. 09/062,275, incorporated herein by reference. However, this method has drawbacks in that the application of edge pressure may give rise to cracking of the glass comprising the front and back faces of the panel.

Additionally, other conventional methods have attempted to increase the efficiency of the LC material filling process and LCD panel fabrication. However, these methods relating to displays (e.g., especially flat panel displays) still are problematic, and fail to provide a rapid liquid crystal filling process for the otherwise substantially completed panel.

Specifically, none of the conventional systems and methods provides for efficiently applying the liquid crystal between the plurality (e.g., two) of panel plates, enabling a uniform distribution of the liquid over the entire interior surface either prior to or after vacuum pump-down. Such a feature would allow for a rapid uniform distribution of the liquid crystal with minimum air entrapment and bubble formation (e.g., both of which are major concerns in the LCD fabrication art).

Furthermore, uniform distribution of the liquid obviates the need for substantial additional time for liquid diffusion or re-arrangement to provide the necessary smooth, continuous and uniform distribution of the liquid crystal medium within the panel.

Thus, with conventional methods, a large time period is required for the liquid crystal material to spread uniformly and continuously throughout the panel from individual droplets deposited onto the panel or by back pressure filling after pump-down with the two portions of the panel affixed to one another, and drawing in the liquid through a narrow channel from a liquid crystal reservoir.

For example, in one conventional method, at least one precision applicator or "micro syringe" is used as a delivery system for the liquid crystal material, for depositing an array of precisely spaced droplets onto a plate making up one half of an LCD panel. The droplet deposits are made at atmospheric pressure. However, filling is not performed within the vacuum chamber, thereby increasing the difficulty in handling and making the filling process more prone to contamination.

Additionally, the micro-syringe delivery system is very costly and cumbersome to operate, since the precision of the volume of each droplet required is such that if the total amount of liquid (e.g., by all of the micro-syringes) is off by even a small amount (e.g., 5%), the panel either will be partially collapsed or will be bulged outwardly after the two plates of the panel are joined. Moreover, this conventional method has no mechanism or method for bleeding off excess material. Thus, there is little, if any, margin of error for the total volume of the droplets deposited onto the panel plate. Further, the micro-syringe is expensive and requires extremely accurate calibration.

Other systems are known which pump out the panel, then place one partially opened edge in a trough of LC material, and expose the system to backfill pressure to fill the panel. This is a very complex, as well as very time-consuming, procedure.

Yet another disadvantage of the conventional systems is that some systems are unable to use both spacer beads and lithographically placed studs for providing a predetermined, uniform gap between the first and second panel plates of the display. Specifically, some conventional methods may only use either of the spacer beads or the lithographically placed studs.

SUMMARY OF THE INVENTION

In view of the foregoing and other problems of the conventional systems and methods, it is an object of the present invention to provide a simplified and more efficient method for filling an unassembled LCD panel at atmospheric pressure.

Another object is to provide a less costly method and apparatus for filling the LCD panel.

Yet another object is provide a method and apparatus in which both spacer beads and lithographically placed studs may be provided selectively for providing a uniform, predetermined spacing between first and second panel plates of the display.

In a first aspect of the present invention, a system for filling a display panel having first and second panel plates, with liquid crystal material, includes a nozzle for depositing a layer of liquid crystal material over a surface of a first panel plate having peripheral edges to form a shallow cavity for containing the material, a scanning arm, coupled to the nozzle, for uniformly forming, preferably in a single scan, the layer of liquid crystal material over the surface of the first plate of the panel, and an attachment mechanism for placing the second plate over the first plate having the liquid crystal material thereover, thereby to form the display panel. The peripheral edges preferably include an unpolymerized sealant.

In a second aspect of the invention, an apparatus for filling a liquid crystal display panel including first and second plates, at least one of the first and second plates having a drain opening, includes a nozzle for emitting liquid crystal material, a scanning unit for scanning the nozzle to apply uniformly a predetermined amount of liquid crystal material, preferably in a single scan, over an entirety of a surface of the first panel plate at atmospheric pressure, and a robotic arm for positioning a second panel plate over the first panel plate.

In a third aspect, a method for filling a liquid crystal display, includes steps of scanning a nozzle to apply uniformly a predetermined amount of liquid crystal material, preferably in a single scan, over an entire surface of a first panel plate forming a portion of the liquid crystal display, at atmospheric pressure, robotically positioning the second plate over the first panel plate, and providing a cut-out section in one of the first and second panel plates to allow for excess liquid crystal material to drain without deforming the first and second panel plates assembled together to form the liquid crystal display.

Thus, with the invention, a uniform layer of liquid crystal is deposited over a surface of a plate forming the panel, utilizing a unique cylindrical spray nozzle. The nozzle is moved across the plate, thereby covering the entire area of the panel plate with the requisite liquid crystal material preferably in a single scan.

With the present invention, when first and second plates are affixed to form the LCD panel, the liquid crystal material is uniformly dispersed. Thus, the method takes substantially little, if any, additional time to diffuse or re-distribute into the space between the two plates.

Hence, with the unique and unobvious features of the present invention, the filling time is reduced from several hours to minutes, thereby greatly enhancing the throughput of fabrication of the panels.

Thus, the present invention overcomes the difficulties of the conventional methods and systems in several ways.

First, a first panel plate, not yet affixed to the second plate, is sprayed with a continuous and predetermined amount of liquid crystal material per unit area. Secondly, the second panel plate is aligned and attached to the first panel automatically (e.g., robotically). Any excess liquid crystal material is given a means for escaping from the two affixed plates so that a slight overfill of the liquid is not problematic (e.g., no bulging or the like results as in the conventional methods), as the inventive panels include a small region which permits excess fluid to flow out from the panel.

Generally, it is desirable to slightly overfill the plate leading to a much more reliable uniform distribution of the liquid crystal and assuring there is sufficient liquid crystal material within the panel channel.

Additionally, the inventive panel may selectively employ either spacer beads and lithographically placed studs for providing a uniform, predetermined spacing between first and second panel plates of the display.

BRIEF DESCRIPTION OF THE DRAWINGS

The foregoing and other objects, aspects and advantages will be better understood from the following detailed description of a preferred embodiment of the invention with reference to the drawings, in which:

FIG. 1 shows a recessed section of a bottom plate 1 of a vacuum chamber (not own) into which a first panel plate of a display panel is positioned;

FIG. 3 illustrates schematically a liquid crystal nozzle 21 of the device 20 scanning across the first panel plate 1A for depositing liquid crystal material;

FIG. 4 illustrates an aligning and attaching device (e.g., a robotic arm 42 for precisely positioning a second panel plate 1B over the first panel plate 1A situated in a recess 2 shown in FIG. 1;

FIG. 6 shows schematically the first and second plates 1A, 1B affixed prior to setting (e.g., cross linking) of an adhesive (e.g., peripheral edge) with ultraviolet light, in a vacuum chamber 60.

DETAILED DESCRIPTION OF PREFERRED EMBODIMENTS OF THE INVENTION

Figure 2A:
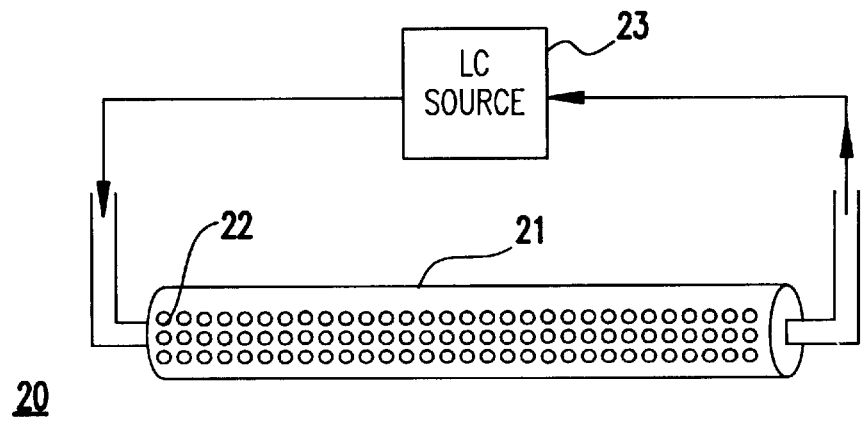
FIGS. 2(A) and 2(B) show details of a liquid crystal deposition device 20 according to the present invention, with FIG. 2(A) being a front view and FIG. 2(B) being a perspective view of the device 20.

Referring now to the drawings, and more particularly to FIG. 1, there is shown a preferred embodiment of the present invention.

FIG. 1 illustrates a general environment for forming the inventive LCD panel.

In FIG. 1, a base plate 1 of a vacuum chamber (not shown) includes a recessed section 2. Recessed section 2 may be one of a plurality of substantially similar (or identical) sections for allowing batch processing of the display panel liquid crystal application. Liquid crystal filling takes place before a plurality of plates (e.g., first and second panel plates) comprising the liquid crystal display, have been affixed together.

It should be noted for extra cleanliness, the vacuum chamber is used for processing, although the vacuum chamber need not be used for all of the process steps. The only crucial step requiring vacuum is the step when the two plates are superposed. Here, all air bubbles entrapped are removed by way of the reduced pressure. Thus, pump-out is performed before the plates are permanently sealed.

Thus, with the present invention, all of the processing steps may be performed either in the vacuum chamber, or only some steps may be performed in the vacuum chamber. For example, first the recessed first panel plate is positioned in ambient atmosphere, and is sprayed with the liquid crystal material. Then, the first plate is placed in the vacuum chamber, and the chamber is pumped-out to evacuate any air bubbles. Then, the second plate is placed over the first plate, and affixed together by virtue of the sealant. Curing may take place in the vacuum chamber or the ambient atmosphere. Alternatively, as mentioned above, all steps may take place in the vacuum chamber.

The panel plates may have any suitable dimensions, with the recessed portion 2 being formed in advance to receive panel plates of a predetermined size depending on the application for the LCD panel. Thus, LCD panels may be formed for any of a plurality of devices having different configurations and sizes (e.g., computer monitor displays, laptop displays, watches, calculators, toys, etc.).

Generally and as described in further detail below, one of the first and second panel plates comprising the otherwise substantially completed panel is inserted within one of the recessed portions 2. A second panel plate, which may be a portion of the overall assembly in a second, nearby section, is for attachment to the first panel plate. The attachment is performed, for example, manually or automatically (e.g., through robotics).

The recessed portion 2 is configured so that there is a precise dimensional fit (e.g., substantially within a range of about 10–25 microns) between the dimensions of the recessed portion 2 and those of the panel plate. Once again, such dimensions will depend on the size of the LCD panel and thus its application, as discussed above.

Additionally, as shown in FIG. 1, there is a slotted recessed drain channel 3 at one end of the base plate 1. This channel 3 aligns with a cut-out opening (e.g., opening 30 shown in FIG. 3 and described in further detail below) of the bottom panel plate. Alternatively, both top and bottom panel plates may have an opening opposite one another. The recessed drain 3 of the base plate 1 allows for excess liquid crystal material to flow thereout when the first and second panel plates are affixed, as described below.

Figure 2B:
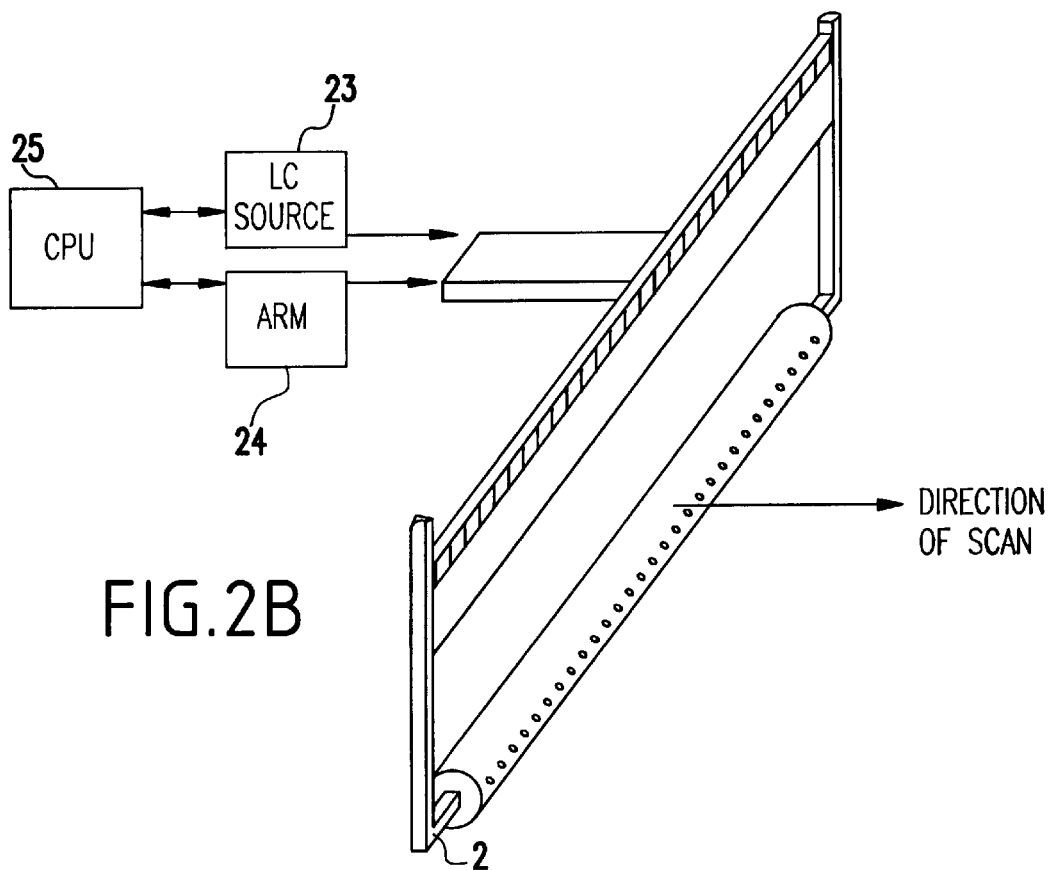

Turning to FIGS. 2(A) and 2(B), the structural details are shown of an apparatus 20, according to the present invention, for filling the first and second panel plates with liquid crystal material.

The apparatus 20 includes a nozzle fixture 21 which may have a substantially cylindrical shape. Obviously, other shapes are also envisioned by the present invention and are believed to be well within the grasp of the originally skilled artisan. The cylindrical nozzle fixture 21 feeds a liquid crystal material (and spacer beads if desired for maintaining a predetermined gap between the first and second panel plates 1A, 1B) as droplets or as a spray onto the panel plate.

It is noted that spray may be preferable to the droplets, especially if performed in a vacuum. If sprayed, it is preferable to undertake this step with the chamber evacuated, for ease of operation. Further, it is noted that the spacers may be in the form of beads or lithographically placed studs for maintaining a uniform spacing between the two panel plates of the assembly.

The nozzle fixture 21 can be formed from metal (e.g., stainless steel), plastic such as polyvinyl chloride or the like, ceramics, and/or any of a number of other materials that are not chemically reactive with the liquid crystal material.

The nozzle fixture 21 preferably is hollow, and preferably contains an array of small holes 22 (e.g., micron-sized diameters) along the axis of the fixture 20 to allow a uniform amount of liquid crystal material per unit area to be ejected as the nozzle fixture 21 is scanned across the panel plate 1A. Holes 21 may have any configuration (e.g., circular, triangular, polygonal, etc.) so long as a uniform amount of liquid crystal material per unit area is ejected.

The fixture 21 is coupled to a pressurized LC source 23 for feeding LC material to the small holes 22 and out to the panel plate 1A.

Figure 2C:
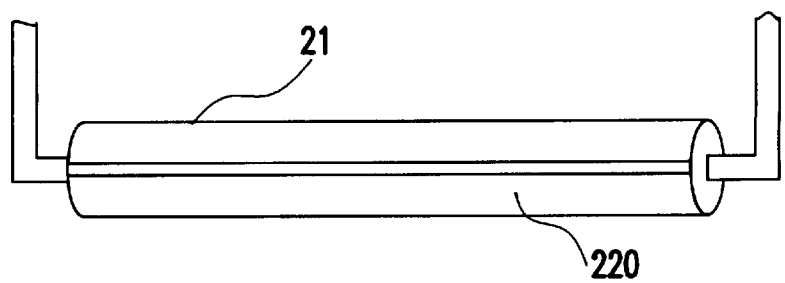
FIG. 2(C) illustrates an alternative embodiment of the nozzle 21 having a continuous slot 220.

It is noted that, alternatively to the small holes 22, a single continuous axial slot 220, as shown in FIG. 2(C), may be provided along the circumferential surface of the fixture to spray or deposit the LC material onto the panel plate.

The nozzle fixture 21 is attached to a scanning arm 24 and the LC source 23 (e.g., a reservoir) of liquid crystal material. The nozzle fixture 21 is movable by the scanning arm 24 (e.g., preferably implemented through a robotic arm or the like) in the direction of scan, as shown in FIG. 2(B).

The nozzle fixture 21, the scanning arm 24, and the reservoir 23 are computer-controlled by a central processing unit 25 or the like, to maintain the proper pressure and travel speed to obtain the correct amount of liquid crystal deposit on the panel plate being assembled, as illustrated in FIG. 3. A fixed amount of LC controlled by the computer 25 is ejected onto the panel plate under preparation. The LC is stored in a reservoir and the required amount for each scan is set by the computer 25.

Preferably, a single pass (e.g., scan) is sufficient to provide the requisite amount of liquid crystal for each panel assembly. It is noted that the "requisite" amount depends on the application. For example, the requisite amount may be on the order of 1-cc. (e.g., for a 15-inch display panel with approximate 5 micron separation between the first and second plates).

The liquid crystal material may be heated to a predetermined temperature, such as from substantially within a range of about 50° C. to 70° C., to obtain a desired viscosity giving rise to a deposition speed consistent with the velocity of the nozzle over the panel plate.

An array of nozzles of the type just described can be positioned within the chamber for increased batch processing with an array of panel plates positioned within the chamber for liquid crystal filling.

It is noted that, while the exemplary embodiment of the present invention, illustrates the nozzle fixture 21 being movable by the scanning arm and robotics, it would be well within the grasp of the ordinarily skilled artisan taking the present invention as a whole to modify the inventive system to move the panel plates in relation to a fixed (stationary) fixture nozzle 21.

As shown in FIG. 3, the sweep of the nozzle 21 delivering droplets (or spray) of liquid crystal material onto one of the panel plates during a scanning sequence is shown. For clarity and ease of understanding, a vacuum chamber shroud typically covering the details shown in FIGS. 1–3 is not shown. As described above, the above-described steps may be performed at atmospheric pressure unless the nozzle emits a fine spray in which case a vacuum atmosphere is preferred.

As shown in FIG. 3, the scanning arm 24 automatically scans the fixture nozzle 21 across the panel plate 1A. In FIG. 3, "L" represents the corners of the bottom plate 1A, and specifically the reflecting corners of the bottom plate 1A for use with detectors described in further detail below. As shown, the lower plate 1A includes a drain opening 30 which is aligned with the channel 3 of the base plate 1. The chamber is now evacuated.

Further, a cleaning mechanism 300 is provided for cleaning the opening 30 for the overfill. Preferably, the cleaning mechanism 300 is formed by a cleaning brush, a wiper blade, a doctor blade, or the like. The cleaning mechanism 300 preferably is computer-controlled by CPU 25, thereby to be activated at a time before (or after) the placement of an upper panel plate 1B (described further below) onto the lower panel plate 1A.

As shown in FIG. 4, a sealant 41 exists (e.g., set in advance) on the lower plate 1A or on both the lower and upper (second) plate 1B, and the second plate 1B is moved by a robotic arm 42, and is placed onto the lower matching plate 1A that has just been sprayed with the nozzle and evacuated of air bubbles. The robotic arm is a lifting arm to place the second (top) panel plate onto the first (lower) panel plate.

Figure 5:
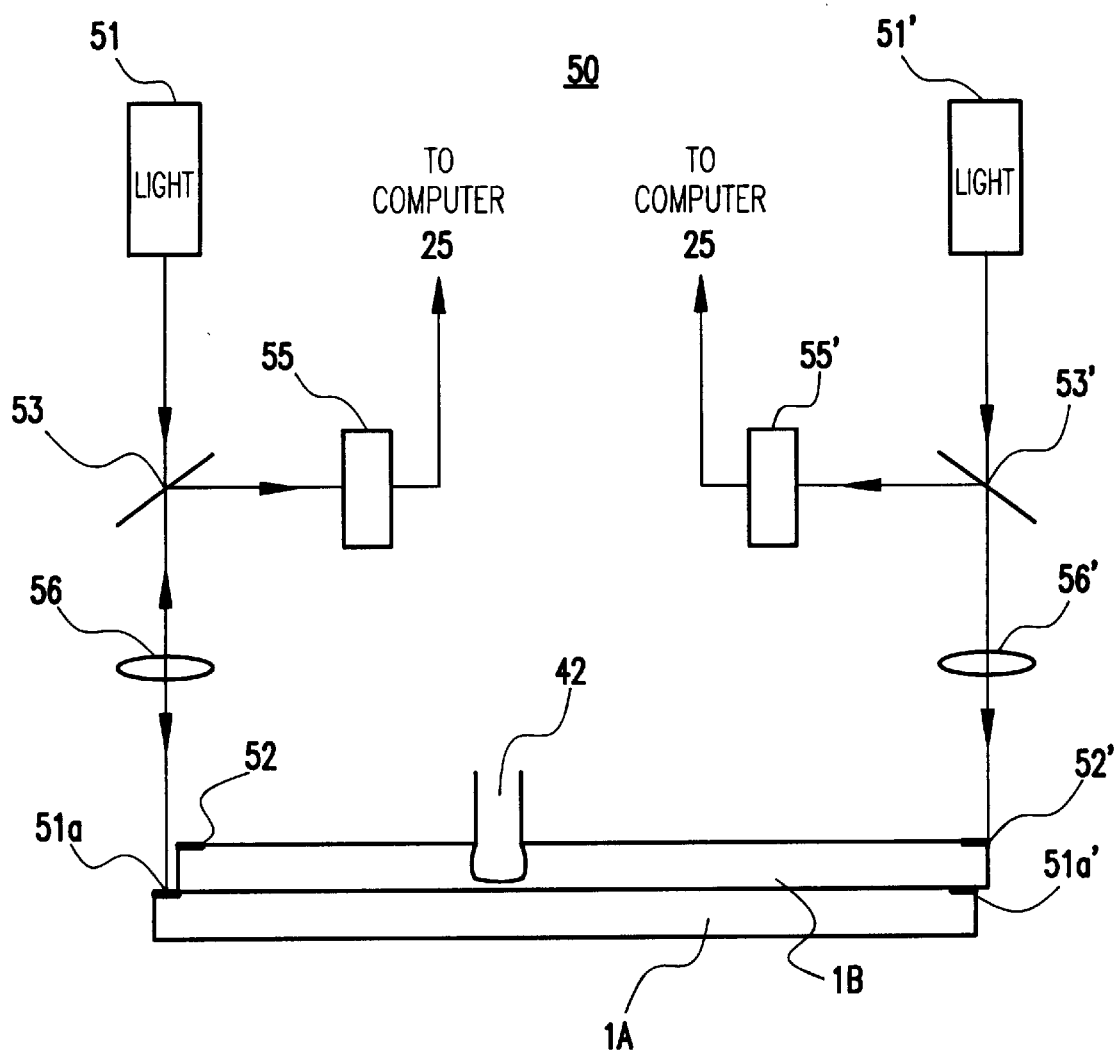
FIG. 5 shows alignment lasers acting in concert with the robotic arm 42 to assure accurate alignment of first and second plates 1A, 1B forming the panel.

As shown in FIG. 5, a system 50 for aligning plate 1B to plate 1A is provided. In the system 50, at least one focused laser 51 is positioned to obtain reflections from spots at reflecting corners 51a of the lower plate 1A. These reflecting spots 51a serve as guide points in alignment calibration. An optical absorber 52 is provided at the corners of, for example, the upper plate 1B to provide the necessary optical contrast to provide for the alignment of the plates. A beam splitter, half-mirror, or the like 53 is provided intermediate the laser 51 and a detector 55. It is noted that after alignment, curing of the panel occurs, for example, by ultraviolet radiation. The curing light is not shown in FIG. 5.

FIG. 5 shows a state in which the plates are not in alignment. Specifically, the top plate 1B must be moved in a leftward direction (e.g., to the reader viewing FIG. 5), to provide proper alignment.

The lasers 51 (e.g., a single laser or a set of lasers) are movable from a position outside of each panel to the respective reflecting corners so that a reflection threshold is sensed by detectors 55. Detectors 55 provide an input to CPU 25 for processing and analysis. A (movable or fixed)

lens 56, such as a convex lens, is provided between the optical absorber 52 and the beam splitter/mirror 53 for appropriate spot focusing of the laser onto the panel corners. A similar arrangement is provided for the top plate 1B and is designated with like reference numerals with a prime (').

When proper alignment of the two plates 1A, 1B of the panel has been achieved, no reflections will be observed since the upper plate 1B contains the optically absorbing material 52, 52' to prevent reflections. The robotic arm 42 makes adjustments of the upper plate 1B with respect to the fixed lower plate 1A until the absence of or greatly diminished reflected laser detection agrees with the predetermined data dimensioning stored in a lookup table (LUT) or the like of CPU 25, for the particular panel size. It is noted that this is only one of many different well-known alignment methods in the art, for achieving plate-to-plate alignment. Manual/physical alignment pins or the like also could be used.

The vacuum chamber 60, shown in FIG. 6, is now slowly refilled with an inert gas such as nitrogen to atmospheric pressure. FIG. 6 represents the state of the two plates of the panel being attached and aligned, at the conclusion of the process.

At least one of the two plates (and preferably at least the lower plate) contains an adhesive (e.g., a sealant 41 shown in FIG. 4 and comprising for, example, light polymerizing sealant (or epoxy)) well-known in the art. The adhesive/sealant is necessary for affixing the two plates 1A, 1B, but this adhesive remains flexible until a final cure. The final cure may be performed, for example, by applying ultraviolet light to the panel, a step which is taken after the panel is removed from the vacuum chamber 60. Again, this curing step is well-known in the art and, for brevity, is not further described herein. FIG. 6 shows the completed panel having the first and second plates affixed together with the sealant and cured in the chamber.

Figure 7:
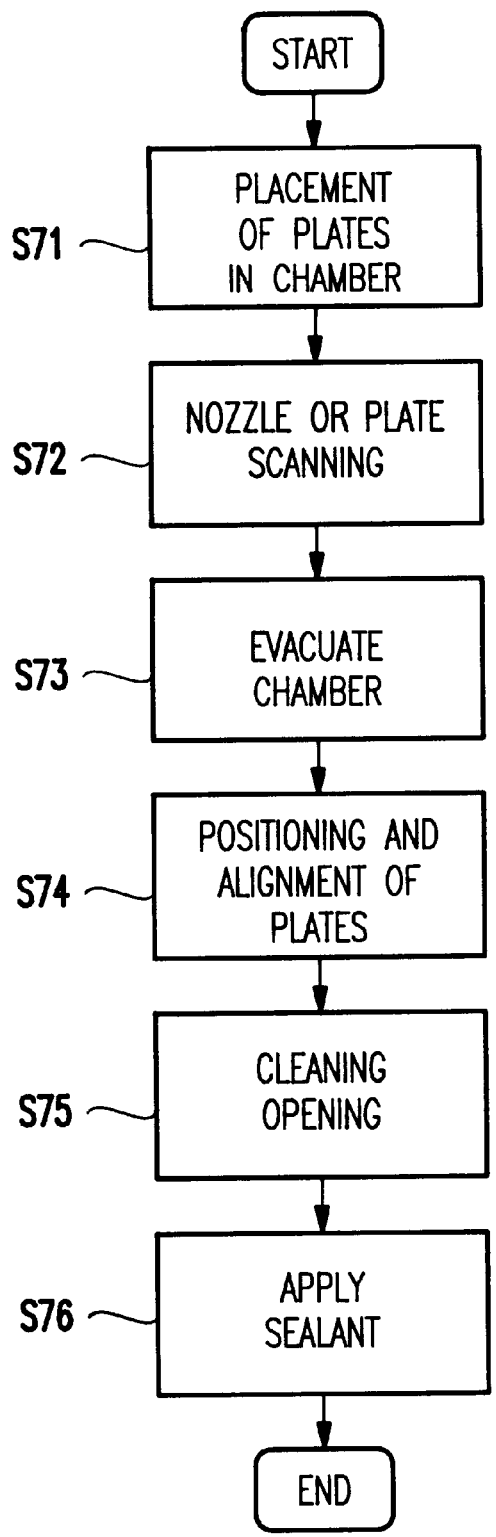
FIG. 7 illustrates a flowchart of a method for making the LCD panel according to the present invention.

Turning to FIG. 7, an operation of the present invention will be described.

Specifically, in operation of the present invention, first in step S71, first and second panel plates, each forming a half of the LCD display panel, are placed within a vacuum chamber 60 (shown in FIG. 6), but are left under atmospheric pressure. The two panel plates are separated, and at least one of the halves (e.g., plates) contains the sealing material. The vacuum chamber 60 has preferably a recessed portion 2 into which one of the panel plates fits snugly (e.g., preferably with about 10–25 micron clearance).

In step S72, the nozzle fixture (e.g., rod) 21, preferably having a substantially cylindrical shape or the like, with the array of small nozzle openings 22 (or the continuous slot 220) is swept along one panel plate (e.g., preferably the lower panel plate) positioned in the recessed portion of the chamber, by a scanning arm 24, to uniformly deposit the liquid crystal material using a predetermined volume of liquid crystal material per panel. Such a predetermined volume is determined by input/design parameter input to and processing performed by CPU 25. Further, it is noted that spacer material may be provided in the spray, or the spacers may be in the form of beads or lithographically placed studs for maintaining a uniform spacing between the two panel plates of the assembly.

Thereafter, in step S73, the vacuum chamber 60 is evacuated (e.g., purged or pumped-out) to remove any air bubbles within the liquid crystal material on the panel plate 1A, thereby further smoothing out the distribution of the liquid crystal material between the panel plates 1A, 1B, while simultaneously permitting any excess liquid crystal material to exude from the panel (through drain opening 3 shown in FIG. 1 and opening 30 shown in FIG. 3). This is an important feature of the inventive structure and method, and reliably prevents either bulging of the panel or collapsing of the panel plates. In the present invention, no wedges are required for alignment since the robotic arm performs the alignment together with the alignment pins or laser reflection positioning tool.

In step S74, a robotic arm 42 lifts and firmly places the second panel plate 1B over the first panel plate 1A containing the liquid crystal material. Positioning can be accomplished in a number of well-known methods.

For example, laser reflections can be used by having small reflecting corners at particular corners of one or more of the panel plates, as described above. Alternatively, locating pins and corresponding holes on the two halves of the panel respectively can be used for alignment purposes. This method is well-known in the art.

Then, in step S75, the opening 30 used for draining any excess material from the panel is cleaned (e.g., wiped) using a robotic cleaning mechanism 40 (arm) or the like.

In step S76, an additional sealant, such as for example, additional light-setting epoxy, may be applied on the edges of the panel plates, and is cured (e.g., hardened). The final seal makes use of cross linking the sealing compound using ultraviolet light, a process well-known in the art.

The procedure described above can be performed with a plurality of panels simultaneously to allow for batch processing using only one set of robotic arms.

With the unique and unobvious structure and method of the present invention, first and second plates are affixed efficiently together to form the LCD panel, and the liquid crystal material is uniformly dispersed. Thus, the method takes substantially little, if any, additional time to diffuse or re-distribute into the space between the two plates.

Further, the precision equipment required by the conventional system and method for depositing droplets of LC material is not required by the invention. Instead, a hollow rod, preferably having a cylindrical shape, is used containing a plurality of small openings (or the continuous slot) along the outer periphery of the of the rod length to serve as a nozzle. The openings extend to the width of the panel plate, and the rod is swept along the length of the panel spraying and depositing the LC material under a controlled pressure.

Hence, with the unique and unobvious features of the present invention, the filling time is reduced from several hours to minutes, thereby greatly enhancing the throughput of fabrication of the panels.

Thus, the present invention overcomes the difficulties of the conventional methods and systems with an efficient, less-costly method and apparatus.

While the invention has been described in terms of a single preferred embodiment, those skilled in the art will recognize that the invention can be practiced with modification within the spirit and scope of the appended claims.

For example, while it has been discussed above that the lower plate is stationary and receives liquid crystal material from a scanning arm scanning thereover, the scanning arm could be stationary and the lower plate could be movable opposed to the scanning arm, thereby to receive the liquid crystal material.

Having thus described our invention, what we claim as new and desire to secure by Letters Patent is as follows:

1. A system for filling a display panel having first and second plates, with liquid crystal material, comprising:

a nozzle for depositing a layer of liquid crystal material over a surface of a first plate of the panel;

a scanning arm, coupled to said nozzle, for uniformly forming the layer of liquid crystal material over the surface of the first plate; and an attachment mechanism for placing said second plate over said first plate having said liquid crystal material thereover, thereby to form said display panel.

2. The system according to claim 1, further comprising: means for sealing and curing said panel.

3. The system according to claim 1, further comprising a vacuum chamber,
wherein, prior to deposition of said liquid crystal material, the first and second plates are placed within the vacuum chamber and are under atmospheric pressure, and said first and second plates are separated, with at least one of said first and second plates containing a sealing material.

4. The system according to claim 3, wherein said vacuum chamber includes a recessed portion into which said first plate fits.

5. The system according to claim 1, wherein said nozzle has a substantially cylindrical shape with an array of nozzle openings,
wherein said attachment mechanism comprises a robotic arm for placing the second plate over the first plate containing the liquid crystal material.

6. The system according to claim 1, further comprising an aligning mechanism for positioning said second plate over said first plate.

7. The system according to claim 6, wherein said aligning mechanism comprises a laser system such that alignment is performed by monitoring laser reflections from reflecting spots at particular corners of the first and second plates.

8. The system according to claim 6, wherein the first plate includes a drain opening, and
wherein before said second plate is placed over said first plate, the vacuum chamber is evacuated to remove any gaseous bubbles within the liquid crystal material on said first plate, thereby further smoothing a distribution of the liquid crystal material on said first plate, while simultaneously permitting any excess liquid crystal material to exude from the opening in said first plate.

9. The system according to claim 8, further comprising a robotic cleaning mechanism for cleaning the opening.

10. The system according to claim 9, further comprising a sealant applied to outer edges of said first and second panel plates attached together.

11. The system according to claim 1, wherein said scanning arm uniformly forms the layer of liquid crystal in a single scan over the surface of the first plate.

12. The system according to claim 1, wherein said nozzle includes a single, continuous slot formed in a circumferential surface of said nozzle.

13. The system according to claim 1, wherein said first plate is stationary with respect to said nozzle.

14. The system according to claim 1, wherein said first plate is movable with respect to said nozzle.

15. An apparatus for filling a liquid crystal display (LCD) panel, comprising:
a housing;
a cylindrically-shaped nozzle for applying a uniform, predetermined amount of liquid crystal material substantially over an entire surface of a first plate, forming a portion of the LCD panel, at atmospheric pressure;
a robotic arm for positioning a second plate over the first plate; and
a cut-out section in the housing to allow for excess liquid crystal material to drain from said first plate, thereby to prevent deformation of an assembled display panel.

16. The apparatus according to claim 15, further comprising:
means for sealing and curing said panel.

17. The apparatus according to claim 15, wherein said housing comprises a vacuum chamber, further comprising:
a scanning arm for scanning said nozzle,
wherein, prior to said robotic arm positioning the second plate over the first plate, the first and second plates are placed within said housing and are under atmospheric pressure, and at least one of the first and second plates contains a sealing material,
wherein said vacuum chamber includes a recessed portion into which said first plate fits, and said nozzle includes one of an array of nozzle openings and a continuous slot, for being swept along the first plate by said scanning arm.

18. The apparatus according to claim 15, further comprising:
an alignment mechanism for aligning said first and second plates during positioning of said second plate over said first plate,
wherein said alignment mechanism comprises a laser positioning system in which laser reflections from reflecting corners at particular corners of the first and second plates, are monitored,
wherein said housing includes a vacuum chamber and said first plate includes a drain opening,
wherein prior to said second plate being positioned over said first plate, the vacuum chamber is evacuated to remove any gaseous bubbles within the liquid crystal material on said first plate, thereby further smoothing out the distribution of the liquid crystal material between the first and second plates, while simultaneously permitting any excess liquid crystal material to exude through the opening in said first plate.

19. The apparatus according to claim 18, further comprising:
a robotic cleaning mechanism for cleaning the opening used for draining any excess material from the panel.

20. A method of filling a liquid crystal display panel including first and second plates, at least one of said first and second plates having a drain opening, comprising:
scanning a nozzle to apply uniformly a predetermined amount of liquid crystal material over an entirety of a surface of the first plate at atmospheric pressure;
while said first plate is positioned in a vacuum chamber, evacuating gaseous bubbles in said liquid crystal material; and
positioning the second plate over the first plate.

21. The method according to claim 20, wherein said scanning uniformly forms the layer of liquid crystal material in a single scan over the surface of the first plate of the panel.

22. A method of filling a liquid crystal display, comprising steps of:
scanning a nozzle to apply uniformly a predetermined amount of liquid crystal material in a single scan over an entire surface of a first plate forming a portion of the liquid crystal display, at atmospheric pressure;
robotically positioning a second plate on the first plate; and
providing a cut-out section in at least one of the first and second plates to allow for excess liquid crystal material to drain, thereby to prevent deformation of the first and second plates assembled together to form the liquid crystal display.

23. The method according to claim 22, wherein said steps of scanning and robotically positioning are performed in a vacuum.

24. The method according to claim 22, wherein all steps but said robotically positioning step are performed in an ambient atmosphere, said robotically positioning step being performed inside of an evacuated vacuum chamber.

* * * * *